US011913970B2

(12) United States Patent
Bateni et al.

(10) Patent No.: US 11,913,970 B2
(45) Date of Patent: Feb. 27, 2024

(54) WIRELESS MOTION DETECTION USING MULTIBAND FILTERS

(71) Applicant: Aerial Technologies Inc., Montreal (CA)

(72) Inventors: Seyedehsan Bateni, Montreal (CA); Negar Ghourchian, Montreal (CA); Michel Allegue Martinez, Terrebonee (CA); David Grant, Santa Rosa Valley, CA (US)

(73) Assignee: Aerial Technologies Inc., Montreal (CA)

( * ) Notice: Subject to any disclaimer, the term of this patent is extended or adjusted under 35 U.S.C. 154(b) by 99 days.

(21) Appl. No.: 16/798,148

(22) Filed: Feb. 21, 2020

(65) Prior Publication Data

US 2020/0292572 A1    Sep. 17, 2020

Related U.S. Application Data

(60) Provisional application No. 62/809,436, filed on Feb. 22, 2019.

(51) Int. Cl.
*G01P 13/00* (2006.01)
*G08B 13/00* (2006.01)
*H04W 88/02* (2009.01)
*H04W 84/12* (2009.01)

(52) U.S. Cl.
CPC .............. *G01P 13/00* (2013.01); *G08B 13/00* (2013.01); *H04W 84/12* (2013.01); *H04W 88/02* (2013.01)

(58) Field of Classification Search
CPC ........ G01P 13/00; G08B 13/00; H04W 84/12; H04W 88/02
See application file for complete search history.

(56) References Cited

U.S. PATENT DOCUMENTS

| 8,073,441 | B1 | 12/2011 | Unger et al. |
| 8,461,988 | B2 | 6/2013 | Tran |
| 8,864,663 | B1 | 10/2014 | Kahn |
| 9,219,790 | B1 | 12/2015 | Filev et al. |

(Continued)

FOREIGN PATENT DOCUMENTS

| CA | 3044480 | 5/2018 |
| CN | 105828289 | 8/2016 |

(Continued)

OTHER PUBLICATIONS

PCT Application No. PCT/IB2020/051503 International Search Report and Written Opinion dated Jul. 30, 2020.

(Continued)

*Primary Examiner* — Mohammad K Islam
*Assistant Examiner* — Xiuqin Sun
(74) *Attorney, Agent, or Firm* — Rosenberg, Klein & Lee

(57) ABSTRACT

A wireless motion detection system is provided which uses a sharp band-stop and low-pass filters to reject unwanted low and high frequency components of a signal in the CSI. A gap in the frequency domain is caused by taking the absolute value of the signal when using the absolute value of channel matrix H√ for motion detection. A sharp band-stop (notch) filter is used to reject any unwanted signals that have significant components in this gap. A low-pass filter is used to reject all unwanted signal after the motion highest frequency.

16 Claims, 8 Drawing Sheets

(56) References Cited

U.S. PATENT DOCUMENTS

| | | |
|---|---|---|
| 9,414,115 B1 | 8/2016 | Mao et al. |
| 9,703,892 B2 | 7/2017 | Ramer et al. |
| 9,854,292 B1 | 12/2017 | Matthews et al. |
| 9,867,548 B2 | 1/2018 | Le et al. |
| 9,985,846 B1 | 5/2018 | Roman et al. |
| 10,045,191 B2 | 8/2018 | Nguyen et al. |
| 10,374,646 B1 | 8/2019 | Fletcher |
| 10,419,880 B1 | 9/2019 | Long et al. |
| 10,818,384 B1 | 10/2020 | Peterson et al. |
| 10,999,705 B2 | 5/2021 | Martinez |
| 11,017,688 B1 | 5/2021 | Arazi |
| 11,039,278 B1 | 6/2021 | Carreiro et al. |
| 11,082,109 B2 | 8/2021 | Martinez |
| 11,218,769 B2 | 1/2022 | Martinez |
| 11,448,726 B2 | 9/2022 | Martinez |
| 11,523,253 B2 | 12/2022 | Martinez |
| 11,586,952 B2 | 2/2023 | Martinez |
| 11,593,837 B2 | 2/2023 | Martinez |
| 11,611,382 B2 | 3/2023 | Martinez |
| 2002/0188668 A1* | 12/2002 | Jeffery .................. H04M 11/062 709/203 |
| 2006/0224938 A1 | 10/2006 | Fikes et al. |
| 2007/0024580 A1 | 2/2007 | Sands et al. |
| 2007/0266395 A1 | 11/2007 | Lee et al. |
| 2008/0262909 A1 | 10/2008 | Li et al. |
| 2010/0242063 A1 | 9/2010 | Slaney et al. |
| 2011/0029277 A1 | 2/2011 | Chowdhary et al. |
| 2011/0117924 A1 | 5/2011 | Brunner et al. |
| 2011/0129047 A1* | 6/2011 | Mashino ............... H04B 1/1027 375/350 |
| 2011/0258039 A1 | 10/2011 | Patwa et al. |
| 2012/0053472 A1 | 3/2012 | Tran |
| 2012/0135733 A1 | 5/2012 | Cormier et al. |
| 2012/0289147 A1 | 11/2012 | Raleigh et al. |
| 2012/0324494 A1 | 12/2012 | Burger et al. |
| 2013/0014136 A1 | 1/2013 | Bhatia et al. |
| 2013/0028443 A1 | 1/2013 | Pance et al. |
| 2013/0053990 A1 | 2/2013 | Ackland |
| 2013/0076528 A1 | 3/2013 | Boettner |
| 2013/0102256 A1* | 4/2013 | Cendrillon ........... H04B 7/0854 455/63.4 |
| 2013/0115974 A1 | 5/2013 | Lee et al. |
| 2013/0326554 A1 | 12/2013 | Shkedi |
| 2014/0033240 A1 | 1/2014 | Card et al. |
| 2014/0181100 A1 | 6/2014 | Ramer et al. |
| 2014/0223467 A1 | 8/2014 | Hayton et al. |
| 2014/0278389 A1* | 9/2014 | Zurek .................... G10L 15/20 704/231 |
| 2014/0358012 A1 | 12/2014 | Richards et al. |
| 2015/0026708 A1 | 1/2015 | Ahmed et al. |
| 2015/0050923 A1 | 2/2015 | Tu et al. |
| 2015/0092747 A1 | 4/2015 | Ganesan |
| 2015/0110471 A1 | 4/2015 | Zheng |
| 2015/0113556 A1 | 4/2015 | Weast et al. |
| 2015/0121428 A1 | 4/2015 | Nguyen et al. |
| 2015/0365787 A1 | 12/2015 | Farrell |
| 2016/0057472 A1 | 2/2016 | Gupta et al. |
| 2016/0105700 A1 | 4/2016 | Collins et al. |
| 2016/0127766 A1 | 5/2016 | Luk et al. |
| 2016/0174185 A1 | 6/2016 | Ramakrishnan et al. |
| 2016/0253710 A1 | 9/2016 | Publicover et al. |
| 2016/0277529 A1* | 9/2016 | Chen .................... H04L 67/306 |
| 2016/0315682 A1 | 10/2016 | Liu et al. |
| 2016/0337701 A1 | 11/2016 | Khare et al. |
| 2016/0344779 A1 | 11/2016 | Jain et al. |
| 2017/0032191 A1 | 2/2017 | Ackland |
| 2017/0068790 A1 | 3/2017 | Fuerst |
| 2017/0135635 A1 | 5/2017 | Bostick et al. |
| 2017/0160089 A1 | 6/2017 | Jang et al. |
| 2017/0293729 A1 | 10/2017 | Movva |
| 2017/0315711 A1 | 11/2017 | Adams |
| 2017/0332192 A1 | 11/2017 | Edge |
| 2017/0354349 A1 | 12/2017 | Mohapatra et al. |
| 2017/0366955 A1 | 12/2017 | Edge |
| 2018/0008207 A1 | 1/2018 | Sarkela et al. |
| 2018/0035072 A1 | 2/2018 | Asarikuniyil et al. |
| 2018/0091952 A1 | 3/2018 | Sant et al. |
| 2018/0181094 A1 | 6/2018 | Funk et al. |
| 2018/0184165 A1 | 6/2018 | Maughan et al. |
| 2018/0330406 A1 | 11/2018 | Deluca et al. |
| 2018/0366228 A1 | 12/2018 | Buck |
| 2019/0051342 A1 | 2/2019 | Wootton et al. |
| 2019/0174170 A1 | 6/2019 | Chen |
| 2019/0178980 A1* | 6/2019 | Zhang ..................... G01S 7/415 |
| 2019/0188756 A1 | 6/2019 | Bradley et al. |
| 2019/0246371 A1 | 8/2019 | Hwang et al. |
| 2019/0252079 A1 | 8/2019 | Constantin et al. |
| 2019/0306023 A1 | 10/2019 | Vasseur et al. |
| 2020/0036592 A1 | 1/2020 | Kholaif |
| 2020/0090022 A1 | 3/2020 | Ma et al. |
| 2020/0112939 A1 | 4/2020 | Scharf et al. |
| 2020/0120384 A1 | 4/2020 | Armaly |
| 2020/0133383 A1 | 4/2020 | Ahlstrom et al. |
| 2020/0186321 A1 | 6/2020 | Hwang et al. |
| 2020/0226388 A1 | 7/2020 | Ghessassi |
| 2020/0265700 A1 | 8/2020 | Bergman et al. |
| 2020/0296463 A1 | 9/2020 | Martinez |
| 2020/0302478 A1 | 9/2020 | Martinez |
| 2020/0303046 A1 | 9/2020 | Martinez |
| 2020/0327430 A1 | 10/2020 | Martinez |
| 2020/0328793 A1 | 10/2020 | Martinez |
| 2020/0329343 A1 | 10/2020 | Martinez |
| 2020/0383119 A1 | 12/2020 | Sun et al. |
| 2020/0397365 A1 | 12/2020 | Zhang et al. |
| 2021/0063537 A1 | 3/2021 | Martinez |
| 2021/0120370 A1 | 4/2021 | Martinez |
| 2021/0352441 A1 | 11/2021 | Liu |
| 2022/0060234 A1 | 2/2022 | Martinez |
| 2022/0070633 A1 | 3/2022 | Ghoshal |
| 2022/0167050 A1 | 5/2022 | Martinez |
| 2022/0256429 A1 | 8/2022 | Martinez |
| 2023/0003836 A1 | 1/2023 | Martinez |

FOREIGN PATENT DOCUMENTS

| | | | |
|---|---|---|---|
| WO | WO-2016187458 A1 * | 11/2016 | ......... G06F 16/9535 |
| WO | WO 2018/094502 | 5/2018 | |
| WO | WO 2020/170221 | 8/2020 | |
| WO | WO 2020/240526 | 12/2020 | |
| WO | WO 2021/084519 | 5/2021 | |

OTHER PUBLICATIONS

U.S. Appl. No. 16/798,138 Office Action dated Sep. 8, 2020.
PCT Application No. PCT/IB2020/060271 International Search Report and Written Opinion dated Feb. 15, 2021.
U.S. Appl. No. 16/796,662 Office Action dated Feb. 12, 2021.
U.S. Appl. No. 17/014,720, Michel A. Martinez, Monitoring Activity Using Wi-Fi Motion Detection, filed Sep. 8, 2020.
U.S. Appl. No. 17/006,579, Michel A. Martinez, System and Method for Presence and Pulse Detection From Wireless Systems, Aug. 28, 2020.
PCT/IB2020/060271, System for Multi-Path 5G and Wi-Fi Motion Detection, Nov. 2, 2020.
Deng et al., "CC-DTW: An Accurate Indoor Fingerprinting Localization Using Calibrated Channel State Information and Modified Dynamic Time Warping", Sensors 19, No. 9: 1984, Apr. 28, 2019 (Apr. 28, 2019), [online] [retrieved on Aug. 20, 2020 (Aug. 20, 2020)], Retrieved from the internet: https://www.mdpif.com/1424-8220/9/19/1984.
Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Aug. 2, 2017), [online] [retrieved on Aug. 20, 2020 (Aug. 20, 2020)], Retrieved from the internet: https://aaai.org/ocs/index.php/IAAI/IAAI17/paer/view/15010.
Rui Zhou et al., "Device-free Localization Based on CSI Fingerprints and Deep Neural Networks", 15 Annual IEEE International Conference on Sensing, Communication, and Networking (SECON), Jun. 11, 2018 (Nov. 6, 2018), [online] [retrieved on Aug. 20, 2020

(56) References Cited

OTHER PUBLICATIONS (Aug. 20, 2020] Retrieved from the internet: https://dl.acm.org/doi/10.1145/2639108.2639143.
Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.
Yang Wang et al., "E-eyes: Device-free Location-oriented Activity Identification Using Fine-grained Wifi Signatures", MobiCom'14, pp. 617-628 Sep. 7, 2014 (Jul. 9, 2014), [retrieved on Aug. 20, 2020 (Aug. 20, 2020)], Retrieved from the internet: https://dl.acm.org/doi/10.1145/2639108.2639143.
PCT Application No. PCT/IB2020/055186 International Search Report and Written Opinion dated Oct. 15, 2020.
PCT/IB2020/051503, Handling Concept Drift in Wi-Fi Based Localization, Feb. 22, 2020.
U.S. Appl. No. 16/796,662, Michel A. Martinez, Smart Media Display, filed Feb. 20, 2020.
U.S. Appl. No. 16/795,198, Michel A. Martinez, Advertisement Engagement Measurement, filed Feb. 19, 2020.
U.S. Appl. No. 16/798,138, Michel A. Martinez, Small Motion Vector Identification in a Wi-Fi Motion Detection System, filed Feb. 21, 2020.
U.S. Appl. No.16/794,668, Michel A. Martinez, Robotic H Matrix Creation, filed Feb. 19, 2020.
U.S. Appl. No. 16/795,319, Michel A. Martinez, Wi-Fi Based Condition Monitoring, filed Feb. 22, 2020.
U.S. Appl. No. 16/795,219, Michel A. Martinez Self-Learning Based on Wi-Fi-Based Monitoring and Augmentation, filed Feb. 19, 2020.
U.S. Appl. No. 17/006,579, Michel A. Martinez, System and Method for Presence and Pulse Detection From Wireless Systems, filed Aug. 28, 2020.
PCT Application No. PCT/IB2020/055186 International Preliminary Report on Patentability dated Nov. 16, 21.
U.S. Appl. No. 16/795,198 Office Action dated Jan. 25, 2022.
U.S. Appl. No. 16/798,319 Office Action dated Dec. 29, 2021.
U.S. Appl. No. 17/006,579 Office Action dated Jan. 6, 2022.
PCT Application No. PCT/IB2020/051503 International Preliminary Report on Patentability dated Aug. 10, 2021.
U.S. Appl. No. 17/131,078 Non-Final Office Action dated Mar. 2, 2022.
Xi et al.; "Electronic Frog Eye: Counting Crowd Using WiFi", Department of Computer Science, Jul. 8, 2014.
Xu et al., "SCPL: Indoor Device-Free Multi-Subject Counting and Localization Using Radio Signal Strength", 2013.
U.S. Appl. No. 17/902,070, Michel A. Martinez, System and Method for Presence and Pulse Detection from Wireless Signals, filed Sep. 2, 2022.
PCT Application No. PCT/IB2020/060271 International Preliminary Report on Patentability dated May 3, 2022.
U.S. Appl. No. 16/794,668 Office Action dated May 24, 2022.
U.S. Appl. No. 16/798,319 Final Office Action dated Jun. 13, 2022.
U.S. Appl. No. 17/539,872 Office Action dated Jan. 5, 2023.
U.S. Appl. No. 16/798,319 Office Action dated Mar. 7, 2023.
U.S. Appl. No. 17/902,070 Office Action dated Mar. 31, 2023.

\* cited by examiner

WIRELESS MOTION DETECTION USING MULTIBAND FILTERS

CROSS-REFERENCE TO RELATED APPLICATIONS

The present application claims the priority benefit of U.S. Provisional Patent Application No. 62/809,436 filed Feb. 22, 2019 and titled "Wireless Motion Detection Using Multiband Filters," the disclosure of which is incorporated by reference in its entirety.

BACKGROUND OF THE INVENTION

1. Field of the Invention

The present disclosure is generally related to wireless motion detection using multiband filters; more specifically, the present disclosure is related to the use of notch and low-pass filters to filter out unwanted signals in a wireless motion detection system.

2. Description of the Related Art

Motion detection is the process of detecting a change in the position of an object relative to its surroundings or a change in the surroundings relative to an object. Motion detection is usually a software-based monitoring algorithm which, for example when it detects motions will signal the surveillance camera to begin capturing the event. An advanced motion detection surveillance system can analyze the type of motion to see if it warrants an alarm.

Wi-Fi location determination, also known as Wi-Fi localization or Wi-Fi location estimation refers to methods of translating observed Wi-Fi signal strengths into locations. A radio map consisting of sets of metadata containing information about the frequency response of the channel, and/or phase response of the channel, and/or impulse response of the channel, and/or received signal strength indicators (RSSI), and/or any other statistic that describes the wireless communication link between paired devices is stored as a profile to be compared later to a signal scan to recognize the location of the device doing the scanning.

SUMMARY OF THE CLAIMED INVENTION

Embodiments of the present invention provide for filtering out unwanted signals in a wireless motion detection system. The system includes a wireless access point, an agent, a cloud network, a low-pass filter, and a notch filter. The low-pass can be on either the cloud or on the wireless access point. The notch filter can be on either the cloud or on the wireless access point. The band-stop or notch filter is implemented and works in real-time and rejects most of the energy of low-frequency variations which could cause a false positive (FP) in a wireless motion detection system, while preserving the most important components in H at DC and above 0.5 Hz. The low-pass or 2D filter rejects most of the energy of high-frequency variations which could cause a FP in a wireless motion detection system, while preserving the most important parts of motion information in H below 5 Hz. Both filters contribute to a practical motion detection system which is expected to have zero FPs related to low and high frequency variations in H, while keeping the sensitivity of the motion/intrusion detection.

BRIEF DESCRIPTIONS OF THE DRAWINGS

Figure 3A:
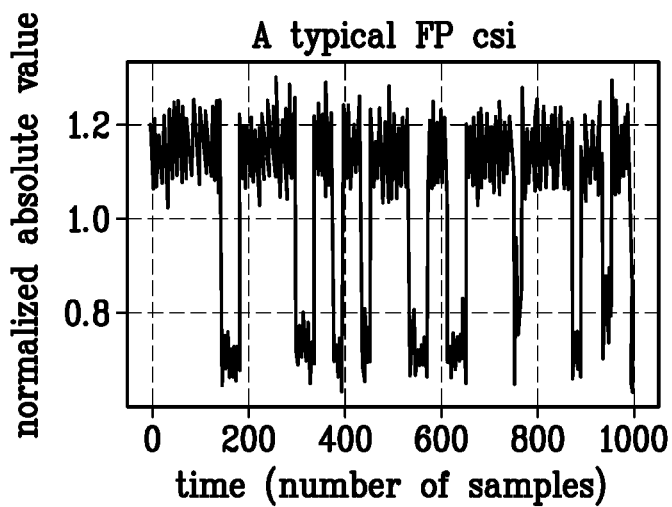
Figure 3B:
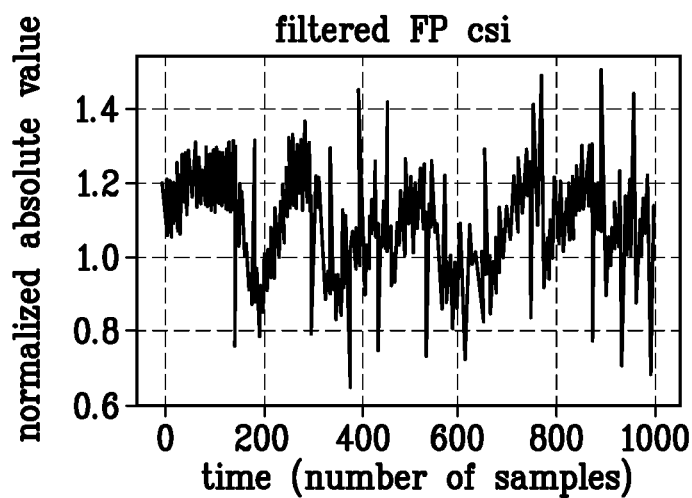

FIGS. 3(a) and 3(b) illustrate an exemplary signal before and after applying a notch filter.

Figure 4:
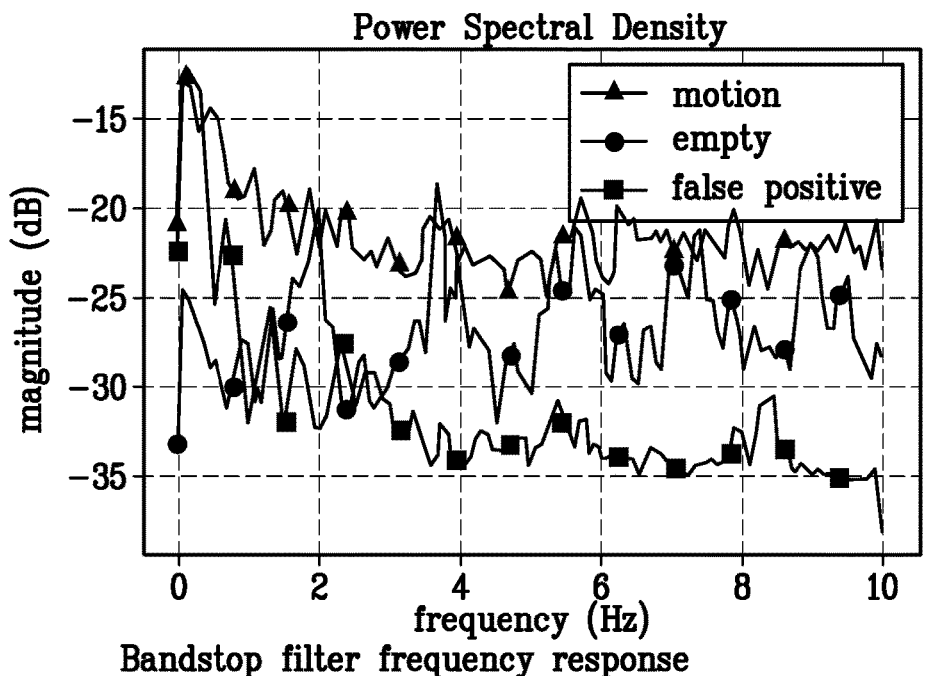

FIG. 4 illustrates an exemplary power spectral density PSD comparison of a typical motion, empty, and false positive signal.

Figure 5A:
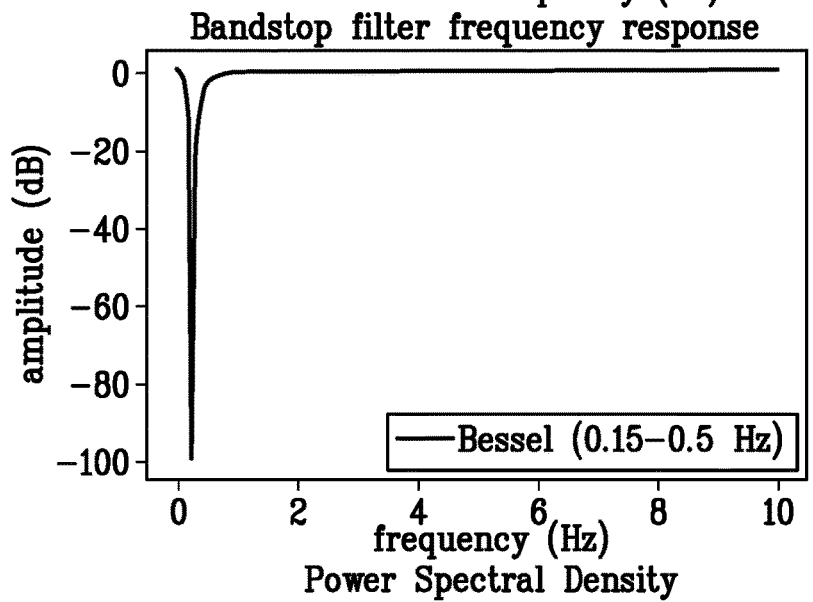
Figure 5B:
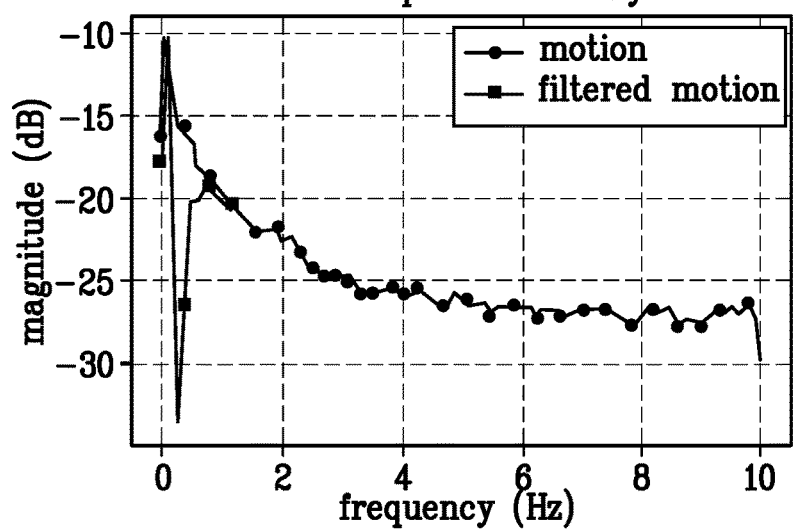

FIGS. 5(a) and 5(b) illustrate an exemplary effect of a band-stop Bessel filter.

Figure 6A:
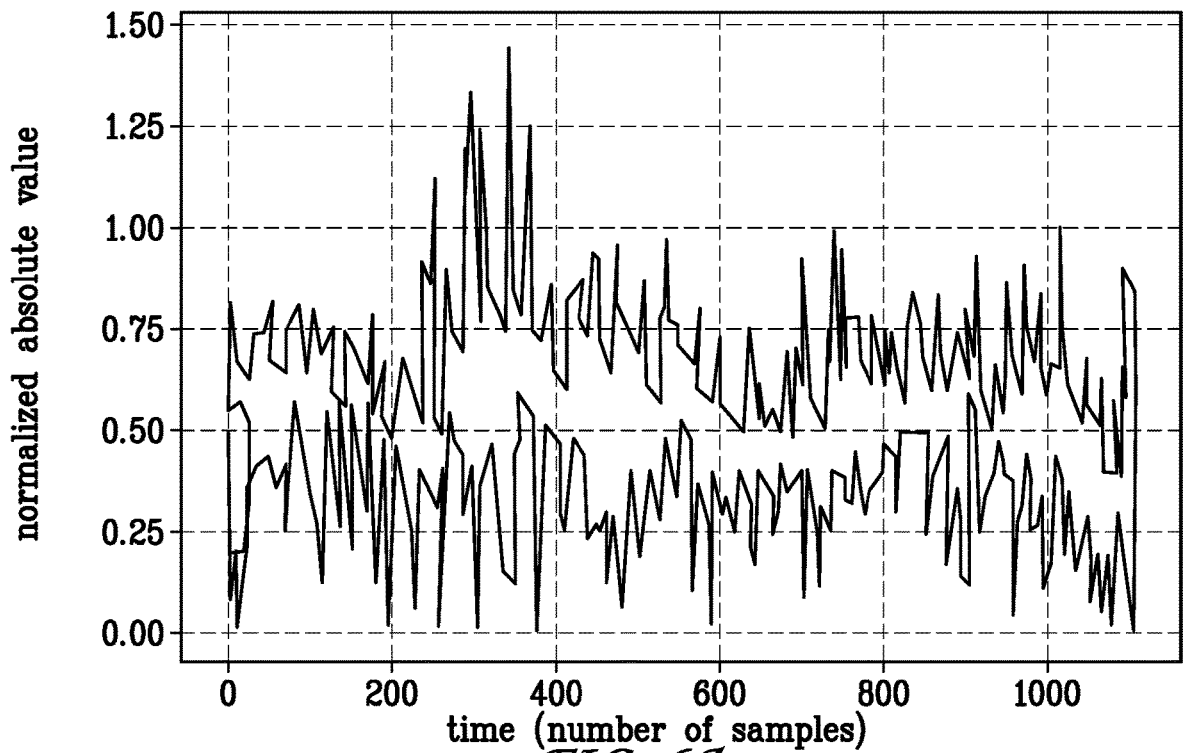
Figure 6B:
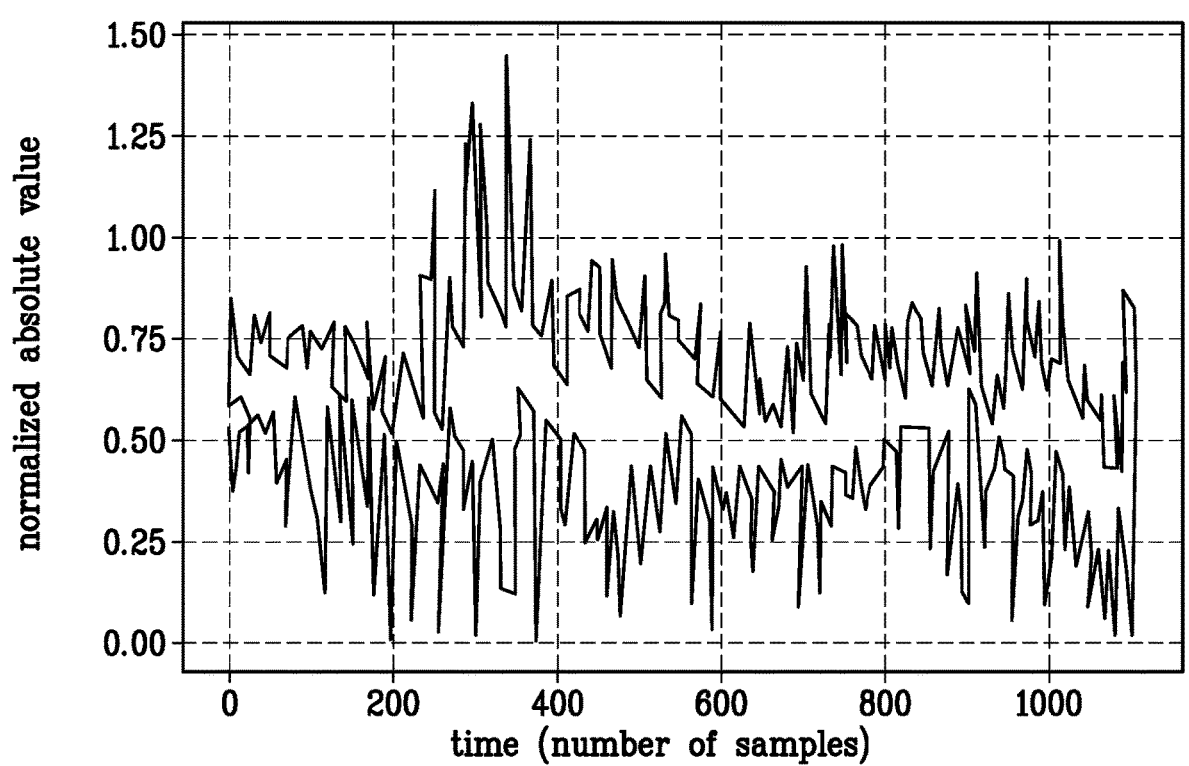

FIGS. 6(a) and 6(b) illustrate an exemplary initializing filter, according to various embodiments.

Figure 7A:
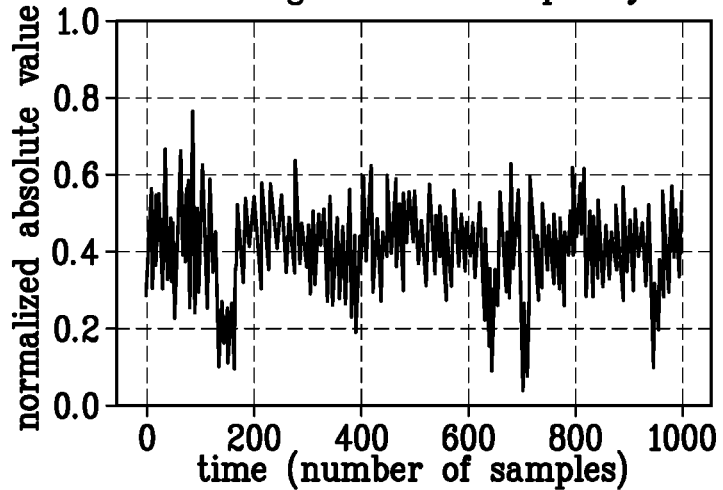
Figure 7B:
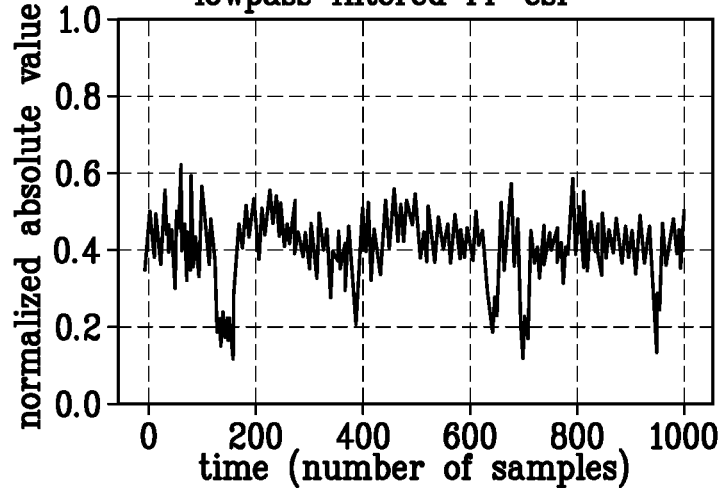
Figure 7C:
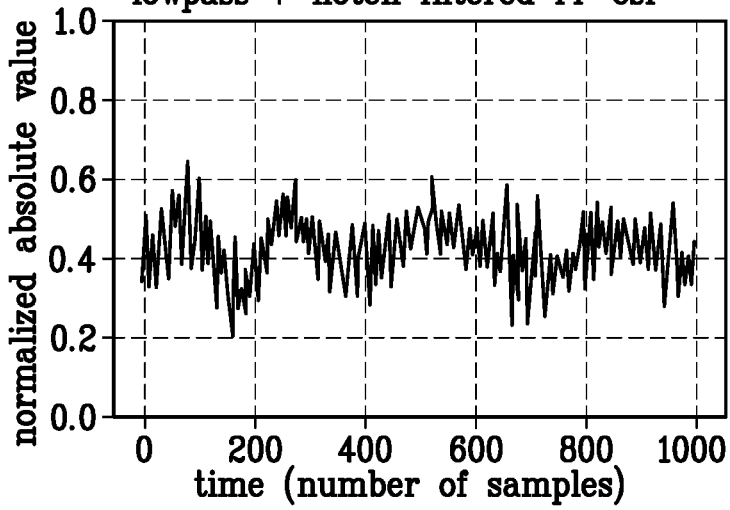

FIGS. 7(a)-(c) illustrates an exemplary application of a low-pass and notch filter.

Figure 8A:
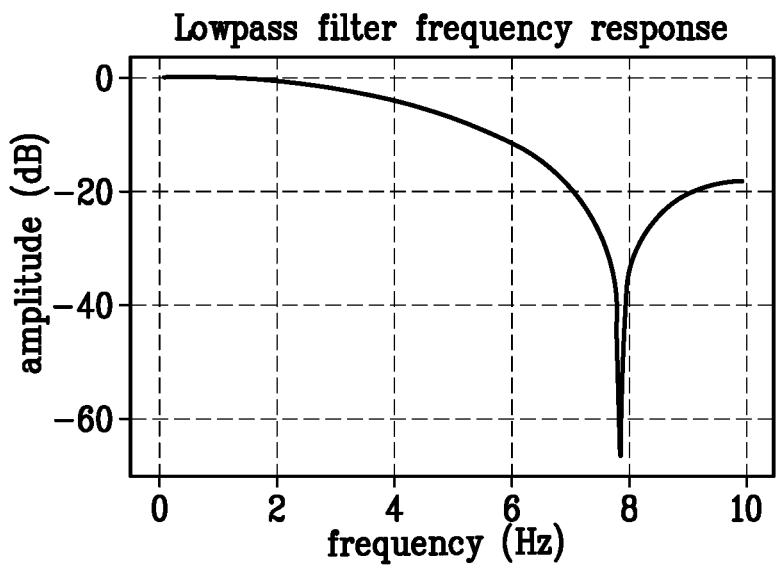
Figure 8B:
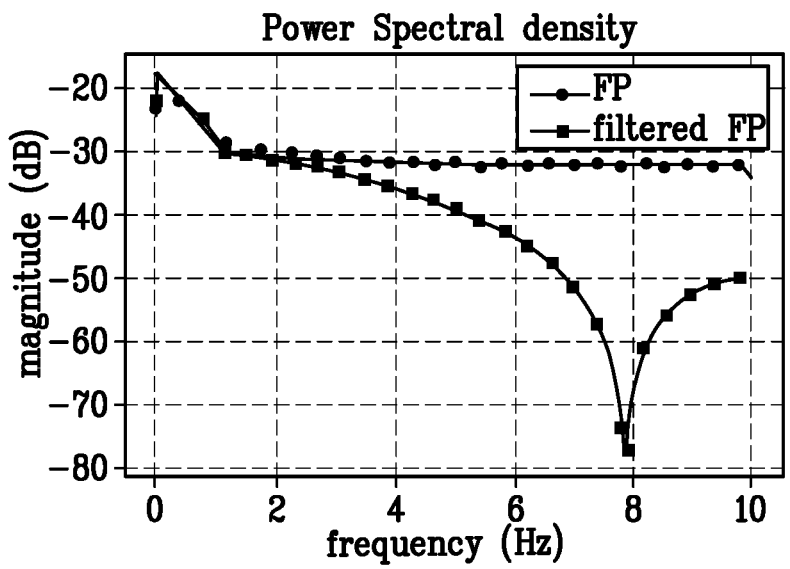
Figure 8C:
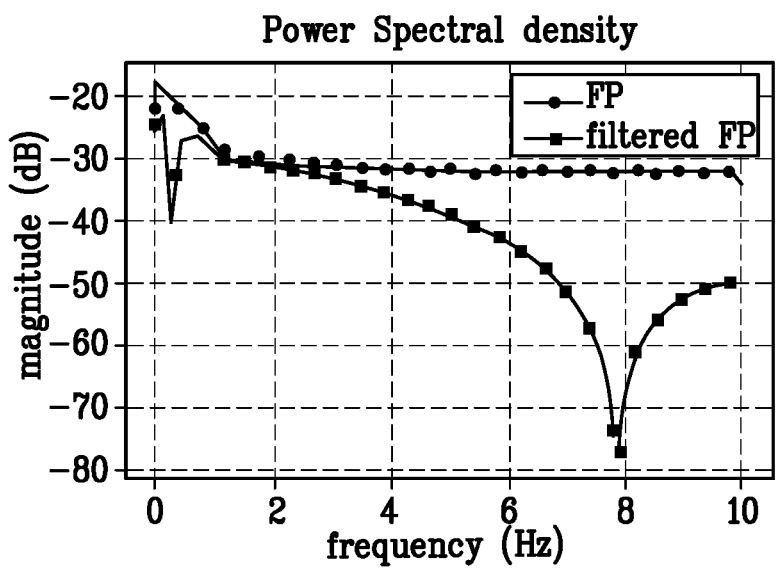

FIGS. 8(a)-(c) illustrates an exemplary effect of a low-pass FIR filter.

Figure 9:
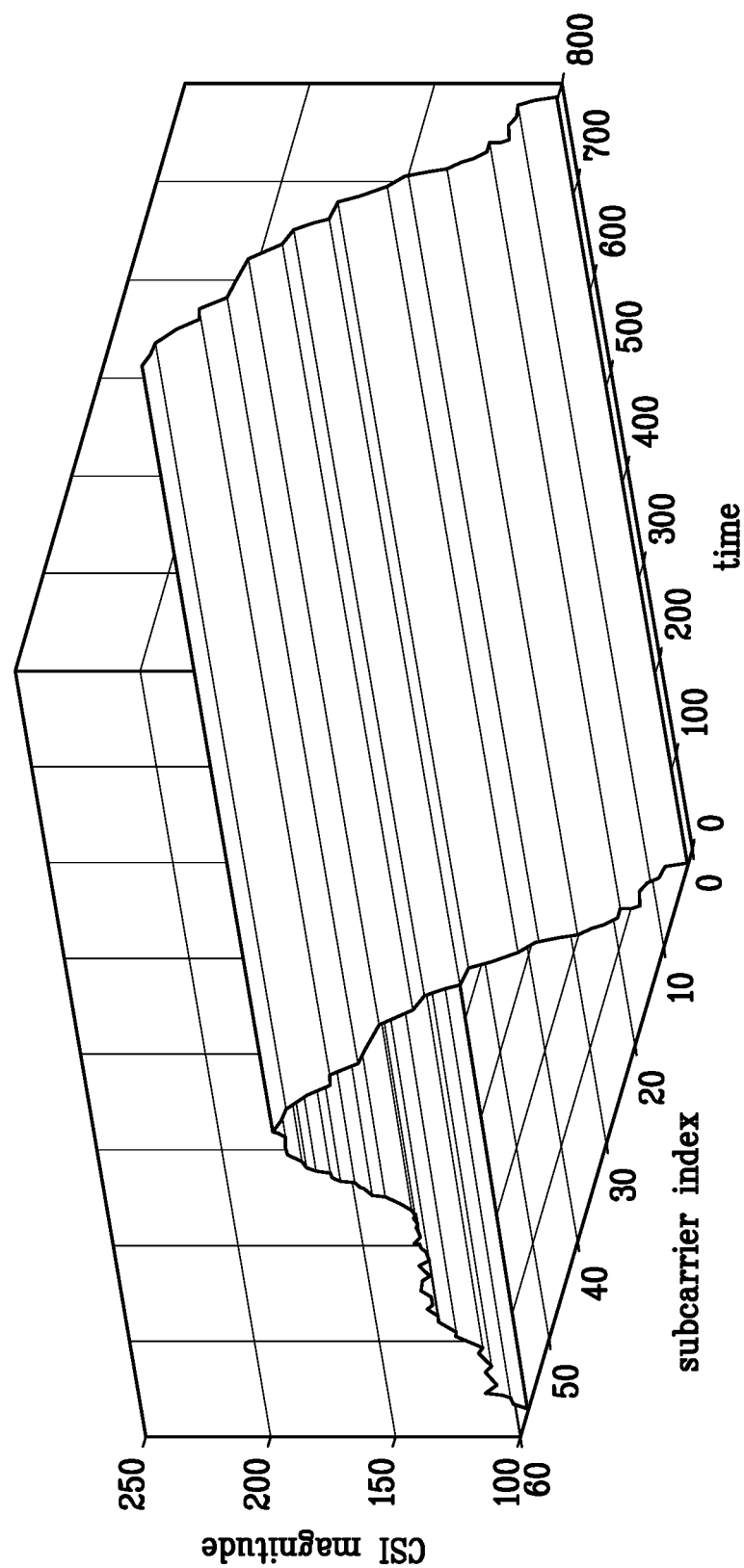

FIG. 9 illustrates an exemplary 2D CSI before applying a filter.

Figure 10:
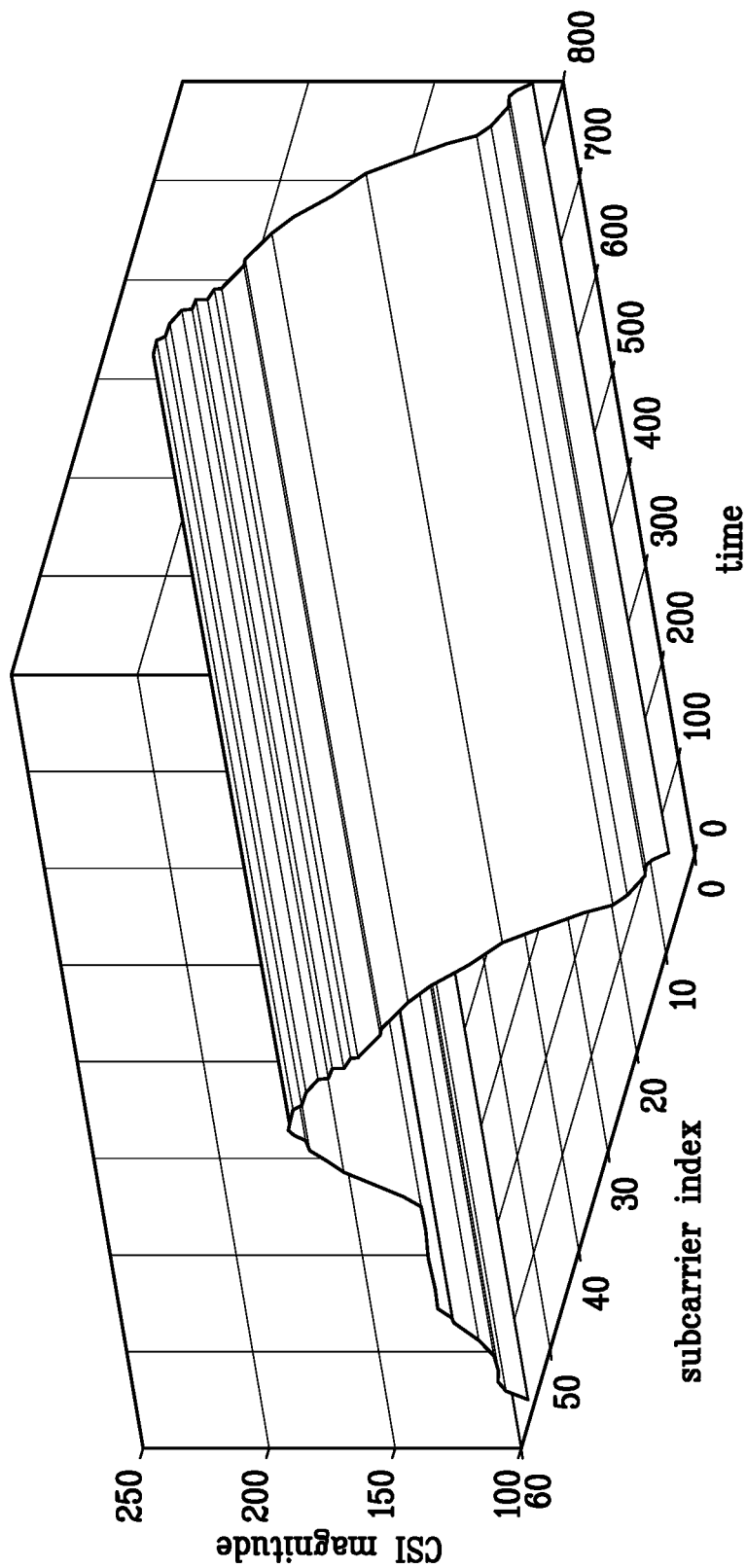

FIG. 10 illustrates an exemplary 2D CSI after applying a filter.

DETAILED DESCRIPTION

A wireless motion detection system is provided which uses a sharp band-stop and low-pass filters to reject unwanted low and high frequency components of a signal in the CSI. A gap in the frequency domain is caused by taking the absolute value of the signal when using the absolute value of channel matrix H√ for motion detection. A sharp band-stop (notch) filter is used to reject any unwanted signals that have significant components in this gap. A low-pass filter is used to reject all unwanted signal after the motion highest frequency.

Figure 1:
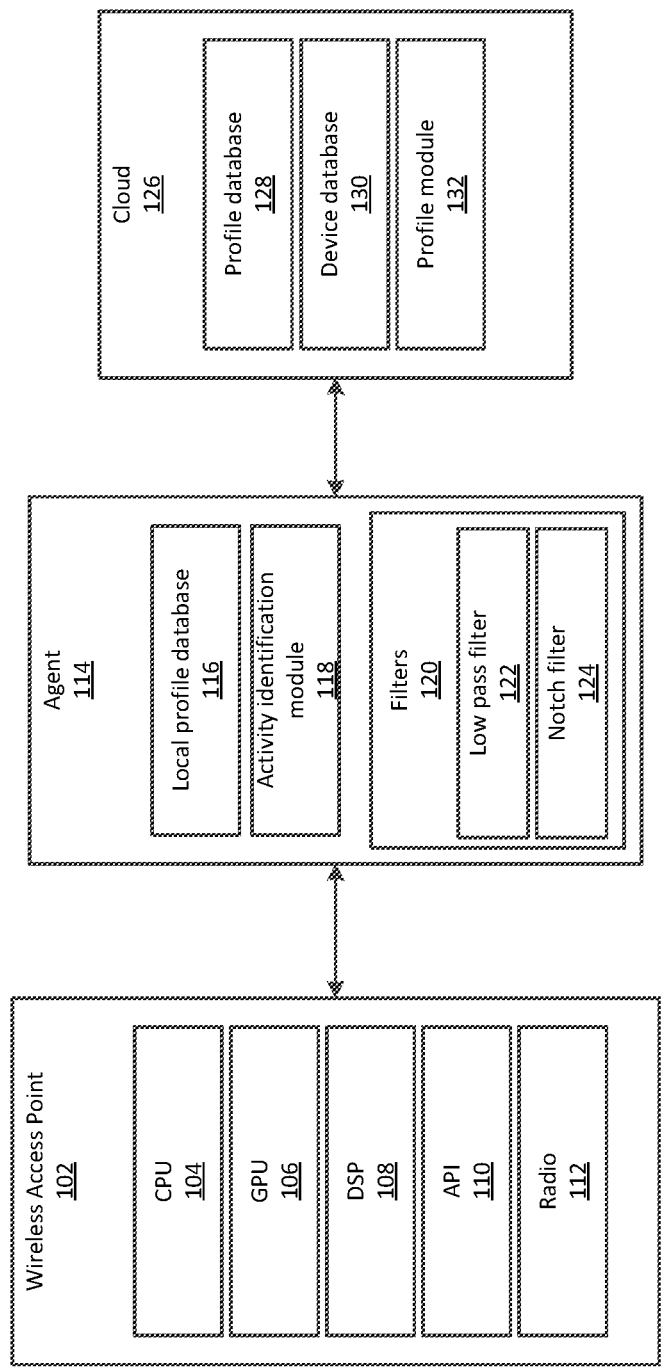
FIG. 1 illustrates an exemplary network environment in which a system for wireless motion detection using multiband filters may be implemented.

FIG. 1 illustrates an exemplary network environment in which a system for wireless motion detection using multiband filters may be implemented. In one example, the wireless access point 102 may be a Wi-Fi access point. In one example, the wireless access point 102 is an 802.11ac or above access point. The wireless transceiver of the wireless access point 102 is in communication with the further stationary device over a corresponding further one of the at least one radio frequency communication link. The wireless access point 102 is configured to record a further channel state information data set for the further one of the at least one radio frequency communication link at a corresponding time. In an embodiment, determining the activity of the person in the environment includes determining the activity of the person in the environment based on a comparison of the further channel state information data set to each of the at least one channel state information profile of each of the plurality of activity profiles. In an embodiment, the activity is determined based on a sum of a similarity measurement of the channel state information data set and a similarity measurement of the further channel state information data set.

A central processing unit (CPU) 104 is the electronic circuitry within a computer that carries out the instructions of a computer program by performing the basic arithmetic, logic, controlling and input/output (I/O) operations specified by the instructions. A graphics processing unit (GPU) 106 is a specialized electronic circuit designed to rapidly manipulate and alter memory to accelerate the creation of images in a frame buffer intended for output to a display device. GPUs 106 are used in embedded systems, mobile phones, personal computers, workstations, and game consoles. Modern GPUs 106 are very efficient at manipulating computer graphics and image processing. Their highly parallel structure makes them more efficient than general-purpose CPUs for algorithms that process large blocks of data in parallel. A digital signal processor (DSP) 108 is a specialized microprocessor (or a SIP block), with its architecture optimized for the operational needs of digital signal processing. The DSP 108 may measure, filter or compress continuous real-world analog signals. An application program interface (API) 110 is a set of routines, protocols, and tools for building software applications. The API 110 specifies how software components should interact. APIs 110 are used when programming graphical user interface (GUI) components. The API 110 provides access to the channel state data to the agent 114. A wireless access point 102 compliant with either 802.11ac or above, using the stock omnidirectional antenna on a radio 112 might have a range of 100 m (0.062 mi). The radio 112, with an external semi parabolic antenna (15 dB gain) with a similarly equipped receiver at the far end, may have a range over 20 miles.

An agent 114 is a device or module configured to collect data from the Wi-Fi chipset of wireless access point 102, filter the incoming data then feed and pass it to the cloud server 126 for activity identification. Depending on the configuration, the activity identification can be done on the edge, at the agent 114 level, or in the cloud server 126, or some combination of the two. A local profile database 116 is utilized when at least a portion of the activity identification is done on the edge. This could be a simple motion/no-motion determination profile, or a plurality of profiles for identifying activities, objects, individuals, biometrics, etc. An activity identification module 118 distinguishes between walking activities and in-place activities. A walking activity causes significant pattern changes of the CSI amplitude over time, since it involves significant body movements and location changes. In contrast, an in-place activity (e.g., watching TV on a sofa) only involves relative smaller body movements and will not cause significant amplitude changes but presents certain repetitive patterns within the CSI measurements. A filter 120 is a device or process that removes some unwanted components or features from a signal. Filtering is a class of signal processing, the defining feature of filters being the complete or partial suppression of some aspect of the signal. Most often, this means removing some frequencies or frequency bands. These filters 120 can be on the agent 114, the cloud server 126, the wireless access point 102 or on all of them. A low-pass filter (LPF) 122 is a filter that passes signals with a frequency lower than a selected cutoff frequency and attenuates signals with frequencies higher than the cutoff frequency. The exact frequency response of the LPF 122 depends on the filter design. A notch filter 124 is a band-stop filter or band-rejection filter which is a filter that passes most frequencies unaltered but attenuates those in a specific range to very low levels. It is the opposite of a band-pass filter. A notch filter 124 is a band-stop filter with a narrow stopband (high Q factor).

A cloud server 126 analyzes and creates profiles describing various activities. The profile module 132 monitors the data set resulting from continuous monitoring of a target environment, to identify multiple similar instances of an activity without a matching profile in such a data set, combine that data with user feedback to label the resulting clusters to define new profiles that are then added to the profile database 128. A profile database 128 is utilized when at least a portion of the activity identification is done in the cloud server 126. This could be a simple motion/no-motion determination profile, or a plurality of profiles for identifying activities, objects, individuals, biometrics, etc. A device database 130 stores the device ID of all connected wireless access points 102.

Figure 2:
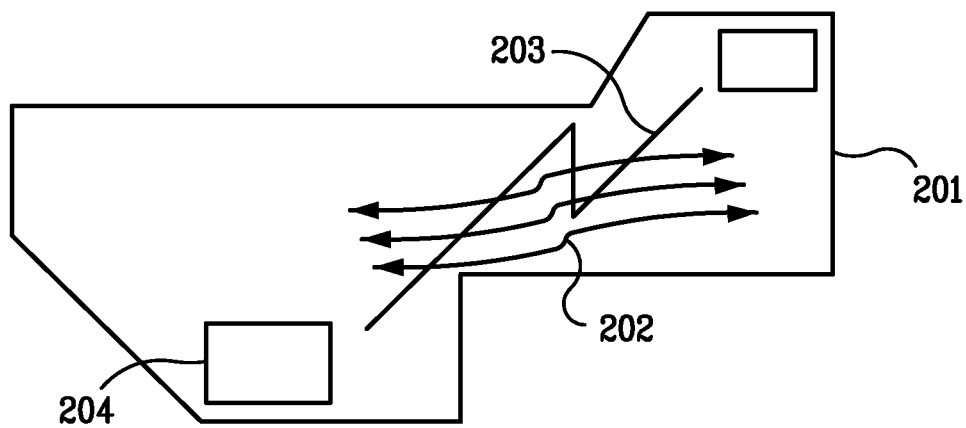
FIG. 2 is a diagram illustrating an exemplary target environment in which a system for wireless motion detection using multiband filters may be implemented.

FIG. 2 is a diagram illustrating an exemplary target environment in which a system for wireless motion detection using multiband filters may be implemented. Such system may be comprised of at least two transceivers 204, which establish a wireless communication link or channel 203 in an active sensing area 201 and which are sensitive to motion 202 (e.g., human motion, pet motion, etc.). The wireless motion detection system is able to collect a wide range of information from all of the active wireless devices within a location. As an example, this information includes but is not limited to physical layer (PHY layer) metadata containing information about the frequency response of the channel, and/or phase response of the channel, and/or impulse response of the channel, and/or received signal strength indicators (RSSI), and/or any other statistic that describes the wireless communication link between paired devices. The wireless motion detection system exploits and quantifies the physical motion occurred in the sensing area 201 by analyzing the changes and disruption of the wireless measurements collected from the wireless devices.

Motion detection systems that employ wireless signals to infer human motion can have false motion detection, or false positives (FP). These artifacts or disturbances may occur due to intrinsic or extrinsic reasons, including but not limited to automatic power control in transmitter or receiver side of the wireless connection. Under certain circumstances, these unwanted changes can extremely affect the channel state information (CSI) signals (or equivalently channel matrix H) such that these distortions can be misclassified as actual human motions. In the context of the systems and methods proposed herein, CSI is taken as an example of channel frequency and phase responses regulated by IEEE 802.11ac or above. This example shall not limit the scope of the approaches presented herein.

A channel matrix H is comprised of CSI information for different frequency sub-bands, herein called sub-carriers, in one dimension, and different times, herein referred to as samples or packets, in the other dimension.

Different timely variations, including intended variation such as human physical motion and unintended variations such as artifacts mentioned above, affect the CSI signals with different frequencies over time. The unwanted variations could be slow or fast changing, herein associated with terms low-frequency and high-frequency variations, respectively.

Given the fact that human physical motion can only happen within a certain frequency range, the proposed system analyzes the frequency components of all temporal variations of recorded CSI signals to distinguish intended and unintended frequency bands.

A sharp notch filter 124 could be used for rejecting the unwanted low-frequency components in the CSI. When taking the absolute value of a signal, for instance a single sinusoid $\sin(\omega)$, its absolute value $\sin(\omega)\sqrt{}\sqrt{(1-\cos((2\omega)/2)}$ has frequency components in DC and is equal or greater than twice the original frequency. The gap in the frequency domain is caused by taking the absolute value of the signal. A sharp notch filter 124 may be used to reject any unwanted signal which has significant components in this gap, when using the absolute value of channel matrix H$\sqrt{}$ for motion detection. The notch filter 124 removes the artifacts caused by low-frequency variations such as step pulses in |H| (i.e., absolute values of H).

A LPF 122 could be used to reject high frequency unwanted signal in CSI. The highest frequency in human motion, disrupting a wireless signal, is a function of motion velocity and the carrier frequency. The LPF 122 could be used to reject all unwanted signal after the motion highest frequency.

FIGS. 3(*a*) and 3(*b*) illustrate an exemplary signal before and after applying a notch filter. Specifically, FIG. 3(*a*) shows an example of step pulses in |H| for one sub-carrier over time. FIG. 3(*b*) depicts the same signal after applying the notch filter. In both plots the Y axis is the normalized amplitude of |H| in one sub-carrier of channel matrix, and the X axis is the number of samples or packets in time with a fixed sampling frequency (e.g., f_s=20 Hz). FIG. 3(*b*) illustrates that the step pulses have been made smoother by eliminating the first harmonic of the pulse, thus reducing the signal variation down to below the pre-defined motion threshold line.

In FIG. 3(*a*), with respect to the frequency domain, it is noticeable that the signal is a pseudo-periodic signal with a period less than 0.5 Hz. FIG. 4 confirms this idea, where the power spectral density (PSD) of the step pulse in FIG. 3(*a*) is compared with the PSD of a typical motion and an empty channel CSI.

FIG. 4 illustrates an exemplary power spectral density PSD comparison of a typical motion, empty, and false positive signal. In FIG. 4, the main lobe of the step pulse PSD is approximately between 0.1-0.15 Hz. Because human motion has barely any information in |H| for the range of above DC and below 0.5 Hz (equivalent to 0-0.25 Hz in complex H), the frequency band is filtered out using an infinite impulse response (IIR) notch filter 124. A LPF 122 is used to eliminate the spurious signal with frequencies higher than the motion highest frequency.

In order to have a LPF 122 with minimum delay (i.e., minimum filter taps) and proper rejection of high frequency unwanted (i.e., spurious) signal at the same time, the FIR filter designed by Kaiser window may be used. Kaiser window has two degrees of freedom, letting both the transition width (i.e., sharpness) and outband loss (i.e., rejection) to be controlled. In order to completely preserve motion band with a rather low-order filter, it is necessary to choose the cut-off frequency greater than the ideal case.

FIGS. 5(*a*) and 5(*b*) illustrate an exemplary effect of a band-stop Bessel filter. Specifically, FIG. 5(*a*) depicts the frequency response of a band-stop Bessel filter, and FIG. 5(*b*) illustrates the effect of applying the band-stop Bessel filter on a typical motion PSD.

FIGS. 6(*a*) and 6(*b*) illustrate an exemplary initializing filter, according to various embodiments. Specifically, FIG. 6 shows the difference that proper initialization of the notch filter 124 could make. For n=0, we need P initial values for x, and Q−1 initial values for y. Assigning zero to all these initial values makes a transition period at the beginning of the filter output, if the first value of x is far from zero. A solution to this issue is to copy the first value of x to all initial values for both x and y.

FIG. 7(*a*)-(*c*) illustrate an exemplary application of a low-pass and notch filter. Specifically, FIG. 7(*a*) depicts a FP CSI with both low and high frequency spurious signal. FIG. 7(*b*) shows the CSI in FIG. 7(*a*) after applying the above mentioned LPF 122. The CSI after applying both LPF 122 and notch filter 124 is depicted in FIG. 7(*c*). It can be seen in FIG. 7(*c*) that; the filtered CSI has smoother step pulses and also less high frequency noise.

FIG. 8(*a*)-(*c*) illustrate an exemplary effect of a low-pass FIR filter. Specifically, FIG. 8(*a*) shows a 5th order n=5 low-pass filter designed by Kaiser window with cut-off frequency equal to 5 Hz, and transition width equal to 0.1 Hz with sampling frequency f_s=20 Hz. As can be seen, choosing 5 Hz for cut-off frequency has left the frequencies up to 2 Hz, which is the most important part of motion information, completely untouched, yet providing 5+ dBloss for frequencies greater than and equal to 5 Hz.

FIG. 8(*b*) and FIG. 8(*c*) respectively show the effect of applying the LPF 122 and both LPF 122 and notch filter 124 on the PSD of an example of CSI signal with artifact, showcasing the frequency bands that are being rejected by each filter.

For an IIR notch filter 124 with the transfer function $$H(z) = \frac{Y(z)}{X(z)} = \frac{\sum_{i=0}^{P} b_i z^{-i}}{\sum_{j=0}^{Q} a_j z^{-j}} \tag{1}$$

the real time implementation could be easily realized using the below differential equation $$y[n] = \frac{1}{a_0}\left(\sum_{i=0}^{P} b_i x[n-i] - \sum_{j=0}^{Q} a_j y[n-j]\right) \tag{2}$$

A LPF 122 could be implemented in real-time using convolution. In case of the H matrix, it is a good practice to use two-dimensional filtering to filter out unwanted signal in both time and sub-carrier domain. Consider a N×N two-dimensional filter h, each row of which the same coefficients of the Nth order low-pass filter. Two-dimensional convolution of filter h and input x is described by $$y[k,n] = \sum_p \sum_q h[p,q] x[k-p+1, n-q+1] \tag{3}$$

where k and p are sub-carrier index and n and q are time index.

The notch filter 124 is used for the purpose of FP elimination. In one example, the notch filter 124 is a 2nd order band-stop Bessel filter with f_low=0.15 Hz and f_high=0.5 Hz.

FIG. 9 illustrates an exemplary 2D CSI before applying a filter, and FIG. 10 illustrates an exemplary 2D CSI after applying a filter. More specifically, FIGS. 9 and 10 depict the before and after, respectively, of applying a 5×5 two-dimensional low-pass filter on the H matrix. Each row of this 5×5 filter is a low-pass FIR filter with specification described in section 2.2. It is clear in FIG. 10 that as a result of this two-dimensional filtering, CSI has become much smoother.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for filtering out signals, the method comprising:
    extracting with an agent channel state information from a chipset operating according to a defined wireless standard of a wireless access point associated with an active sensing area where the wireless access point receives wireless signals via a wireless link according to the defined wireless standard from a wireless device associated with the active sensing area;
    establishing a channel matrix based upon the extracted channel state information comprising channel state information of different frequency sub-bands of the wireless link according to the defined wireless standard in a first dimension of the channel matrix and different samples or packets in a second dimension of the channel matrix;
    filtering with the agent the established channel matrix by applying a low-pass filter and a notch filter to the established channel matrix wherein the low-pass filter filters out a predetermined type of unwanted high frequency signals from the established channel matrix and the notch filter filters out a predetermined type of unwanted low frequency signals from the established channel matrix;
    establishing in dependence upon the filtered established channel matrix and a plurality of profiles a profile of the plurality of profiles to associate with the sensing area where each profile of the plurality of profiles comprises a channel state information profile associated with one of an activity, an object, an individual and a biometric associated with or within the sensing area.

2. The method according to claim 1, wherein
    the predetermined type of unwanted low frequency signals filter from the established channel matrix by the notch filter are those within a gap within a frequency domain corresponding to an absolute value of the channel state information.

3. The method according to claim 1,
    wherein the activity of a person within the sensing area is established in dependence upon a comparison of a sum of a similarity measurement of the filtered established channel matrix and at least one channel state information profile of each profile of the plurality of profiles.

4. The method of claim 1, wherein
    applying the notch filter to filter out the predetermined type of unwanted low frequency signals from the established channel matrix filters reduces in real-time false positives of establishing the profile of the plurality of profiles as motion of a person whilst maintaining components of the established channel matrix filter at DC and above a defined frequency.

5. The method of claim 1, wherein
    applying the notch filter to filter out the predetermined type of unwanted low frequency signals from the established channel matrix filters reduces in real-time false positives of establishing the profile of the plurality of profiles as motion of a person whilst maintaining components of the established channel matrix filter at DC and above a defined frequency; and
    the defined frequency is either:
        0.5 Hz when the absolute value of the established channel matrix is employed; or
        0.25 Hz when the complex value of the established channel matrix is employed.

6. The method of claim 1, wherein
    applying the low-pass filter to filter out the predetermined type of unwanted high frequency signals from the established channel matrix filters reduces in real-time false positives of establishing the profile of the plurality of profiles within the sensing area as motion of a person whilst maintaining components of the established channel matrix filter below a defined frequency.

7. The method of claim 1, wherein
    applying the low-pass filter to filter out the predetermined type of unwanted high frequency signals from the established channel matrix filters reduces in real-time false positives of establishing the profile of the plurality of profiles as motion of 1 person whilst maintaining components of the established channel matrix filter below a defined frequency; and
    the defined frequency is 5 Hz.

8. The method according to claim 1, wherein
    applying the low-pass filter to filter out the predetermined type of unwanted high frequency signals from the established channel matrix comprises applying a N×N two dimensional low-pass filter to the established channel matrix; and
    N is a non-zero positive integer.

9. The method according to claim 1, wherein
    applying the low-pass filter to filter out the predetermined type of unwanted high frequency signals from the established channel matrix comprises applying a N×N two-dimensional low-pass filter to the established channel matrix; and
    each row of the N×N two-dimensional low pass filter is one of:
        a low-pass finite impulse response (FIR) filter where N is a non-zero positive integer;
        a low pass 5th order FIR filter where N is a non-zero positive integer; and
        a low pass 5th order FIR filter where N=5.

10. The method according to claim 1, further comprising
    transmitting the filtered established channel matrix to a cloud server from the agent;
    wherein
    the cloud server establishes the profile of the plurality of profiles.

11. The method according to claim 1, further comprising
    transmitting the filtered established channel matrix to a cloud server from the agent;
    wherein
    at least the agent and the cloud server act in combination to establish the profile of the plurality of profiles; and the plurality of profiles are stored within profile databases accessible to at least the agent and the cloud server.

12. The method according to claim 1, wherein
the agent establishes the profile of the plurality of profiles; and
the plurality of profiles are stored within a profile database accessible to the agent.

13. The method according to claim 1, further comprising
transmitting the filtered established channel matrix to a cloud server from the agent; wherein
the cloud server establishes the profile of the plurality of profiles;
the plurality of profiles are stored within a profile database accessible to the agent;
the cloud server analyses and creates other profiles via a process comprising:
  identifying multiple instances of an activity established by the cloud server by processing the filtered established channel matrix received from the agent
  combining data relating to the identified multiple instances of the activity with user feedback to label the data; and
  storing the data and the label as a new profile of the plurality of profiles within the profile database; and
the multiple instances of the activity established by the cloud server are without any matching profiles within the plurality of profiles.

14. The method according to claim 1, wherein
filtering the established channel matrix with the agent removes artifacts or disturbances within the extracted channel state information arising from an intrinsic aspect of operation of the wireless link between the wireless access point and the wireless device.

15. The method according to claim 1, wherein
filtering the established channel matrix with the agent removes artifacts or disturbances within the extracted channel state information arising from an intrinsic aspect of operation of the wireless link; and
the intrinsic aspect of operation is one of:
  automatic power control within a transmitter of one of the wireless access point and the wireless device; and
  automatic power control within a receiver of one of the wireless access point and the wireless device.

16. The method according to claim 1, wherein
filtering the established channel matrix with the agent removes artifacts or disturbances within the extracted channel state information arising from an intrinsic aspect of operation of the wireless link reduces in real-time false positives of establishing the profile of the plurality of profiles; and
the intrinsic aspect of operation is one of:
  automatic power control within a transmitter of one of the wireless access point and the wireless device; and
  automatic power control within a receiver of one of the wireless access point and the wireless device.

* * * * *